US012454795B2

(12) United States Patent
Glenn et al.

(10) Patent No.: US 12,454,795 B2
(45) Date of Patent: Oct. 28, 2025

(54) MOISTURE/OIL-RESISTANT FIBER/STARCH COMPOSITE MATERIALS

(71) Applicants: The United States of America, as represented by the Secretary of Agriculture, Washington, DC (US); WORLD CENTRIC, Rohnert Park, CA (US)

(72) Inventors: Gregory M. Glenn, Grand Junction, CO (US); Xing Jin, Albany, CA (US); Randal L. Shogren, Columbia Falls, MT (US)

(73) Assignees: The United States of America, as represented by the Secretary of Agriculture, Washington, DC (US); WORLD CENTRIC, Rohnert Park, CA (US)

( * ) Notice: Subject to any disclaimer, the term of this patent is extended or adjusted under 35 U.S.C. 154(b) by 82 days.

(21) Appl. No.: 17/401,712

(22) Filed: Aug. 13, 2021

(65) Prior Publication Data

US 2022/0049428 A1 Feb. 17, 2022

Related U.S. Application Data

(60) Provisional application No. 63/065,688, filed on Aug. 14, 2020.

(51) Int. Cl.
*D21H 17/28* (2006.01)
*B65D 65/38* (2006.01)
(Continued)

(52) U.S. Cl.
CPC ............. *D21H 17/28* (2013.01); *B65D 65/38* (2013.01); *D21H 17/17* (2013.01); *D21H 21/16* (2013.01); *D21H 23/04* (2013.01); *D21J 3/12* (2013.01)

(58) Field of Classification Search
CPC ........ D21H 17/28; D21H 17/17; D21H 21/16; D21H 23/04; D21H 17/16; D21H 27/10;
(Continued)

(56) References Cited

U.S. PATENT DOCUMENTS 5,756,194 A 5/1998 Shogren
5,961,708 A 10/1999 Zetter
(Continued)

FOREIGN PATENT DOCUMENTS

CN 108130788 A * 6/2018 ............. D21F 11/04
EP 0415385 3/1991

OTHER PUBLICATIONS

C. Dang, et al., 2017, "Preparation and Characterization of Hydrophobic Non-Crystal Microporous Starch (NCMS) and its Application in Food Wrapper Paper as a Sizing Agent," BioResources 12(3): 5775-5789.
(Continued)

*Primary Examiner* — Abbas Rashid
*Assistant Examiner* — Matthew M Eslami
(74) *Attorney, Agent, or Firm* — John Fado; Maria Restrepo-Hartwig (57) ABSTRACT

The invention relates to uncoated, fiber/starch composite materials manufactured without the use of fluorochemicals or additional binders that offer superior oil and grease resistance properties. Addition of an internal sizing agent in the preparation of the fiber/starch composite materials results in superior hot water and cold water resistance properties. The fiber/starch composite materials may be used for the manufacture of food service containers. The invention also relates to methods of preparation of the fiber/starch composite materials.

7 Claims, 2 Drawing Sheets

(51) Int. Cl.
  *D21H 17/17* (2006.01)
  *D21H 21/16* (2006.01)
  *D21H 23/04* (2006.01)
  *D21J 3/12* (2006.01)

(58) Field of Classification Search
  CPC ........ D21H 21/52; D21H 17/29; D21H 15/10;
    D21H 11/14; D21H 11/12; B65D 65/38;
    B65D 85/00; D21J 3/12; Y02P 20/582;
    D21F 11/04; D21F 11/00; C08L 3/02;
    C08L 1/02; C08K 7/02; C08K 9/04
  See application file for complete search history.

(56) References Cited

U.S. PATENT DOCUMENTS

| | | | |
|---|---|---|---|
| 6,168,857 | B1 | 1/2001 | Andersen |
| 6,878,199 | B2 | 4/2005 | Bowden |
| 7,083,673 | B2 | 8/2006 | Bowden |
| 7,967,904 | B2 | 6/2011 | Bowden |
| 10,145,068 | B2 | 12/2018 | Hans |
| 10,378,152 | B2 | 8/2019 | Kinast |
| 10,626,557 | B2 | 4/2020 | Colin |
| 2002/0123624 | A1 | 9/2002 | Qiao |
| 2005/0120915 | A1* | 6/2005 | Bowden ................ C08L 101/16 264/300 |
| 2019/0092931 | A1 | 3/2019 | Glenn |
| 2020/0095731 | A1* | 3/2020 | Spender ................ D21H 19/40 |
| 2020/0308359 | A1 | 10/2020 | Glenn |
| 2021/0040693 | A1 | 2/2021 | Glenn |

OTHER PUBLICATIONS

K. El-Tahlawy, et al., 2008 Effect pf Alkyl Ketene Dimer Reacted Starch on the Properties of Starch Microcellular Foam Using a Solvent Exchange Techniques, Carbohydrate Polymers 73: 133-142.

J.K. Fink, 2019, "The Chemistry of Bio-based Polymers," pp. 256-257, John Wiley & Sons. M.A. Hubbe, 2006, Paper's Resistance to Wetting—A Review of Internal Sizing Chemicals and Their Effects, BioResources 2(1): 106-145.

S. Kumar, et al., 2016, "Separation and Analysis Techniques for Bound and Unbound Alkyl Ketene Dimer (AKD) in Paper: A Review," Arab. J. Chem. 9:S1636 to S1642.

M.A. Hubbe, 2006, Paper's Resistance to Wetting—A Review of Internal Sizing Chemicals and Their Effects, BioResources 2(1): 106-145.

D.R. Lu, et al., 2009, "Starch-Based Completely Biodegradable Polymer Materials," EXPRESS Polym. Lett. 3(6): 366-375.

G.M. Glenn, et al., 2001, "In situ laminating process for baked starch-based foams," Ind. Crops Prod.14: 125-134.

P.B. Aebersold, et al., 1987, "Manual for Starch Gel Electrophoresis: A Method for the Detection of Genetic Variation," NOAA Technical Report NMFS 61.

El-Tahlawy, et al., 2008, "Effect of alkyl ketene dimer reacted starch on the properties of starch microcellular foam using a solvent exchange technique," Carbohydr. Polym. 73(1): 133-142.

* cited by examiner

MOISTURE/OIL-RESISTANT FIBER/STARCH COMPOSITE MATERIALS

CROSS-REFERENCE TO RELATED APPLICATIONS

This application claims priority to U.S. Provisional Patent Application No. 63/065,688, filed Aug. 14, 2020, the content of which is expressly incorporated in its entirety by reference herein.

FIELD OF THE INVENTION

The invention relates to uncoated cellulosic fiber/starch materials and methods of preparation of such materials. In the cellulosic fiber/starch materials the starch is evenly distributed within a fiber matrix, and the cellulosic fiber/starch materials do not comprise fluorocarbons or auxiliary binders. Without the addition of an oil-resistant coating, the cellulosic fiber/starch materials offer superior oil and grease resistance. When an internal sizing agent is added in the preparation of the cellulosic fiber/starch materials, the materials offer superior hot water resistance and cold water resistance. The cellulosic fiber/starch materials are useful for the manufacture of food service containers.

BACKGROUND OF THE INVENTION

Single-use plastic packaging made from petroleum-derived polymers like polystyrene, polypropylene, and polyethylene have become problematic due to littering, persistence in the environment, difficulty with recycling, declining fossil resources, and ingestion and accumulation in animals. In contrast, cellulose-based food packaging is becoming increasingly popular due to its biodegradability, compostability, and sustainable production from plants. Examples of cellulose fiber food serving containers include cups, plates, clamshells, paper wraps, etc. However, penetration of such containers by oil and grease in foods, and their transfer onto hands, clothing, and tabletops is a problem. Therefore, these articles are usually coated with materials which block water and oil absorption such as polyethylene, petroleum waxes, acrylics, poly (ethylene-co-vinyl alcohol), polyvinylidene chloride, or polyfluoroalkyl substances (PFAS). None of these are biodegradable and the adherence of the polymers to the paper substrate make recycling difficult. PFAS in particular, may cause cancer and other chronic health conditions. Starch coatings are effective grease barriers but are normally subject to disruption or to dissolving in cold or hot water which diminishes their barrier properties.

Starch is a plentiful, inexpensive, and renewable material that is found in a large variety of plant sources, such as grains, tubers, and fruits. In some cases, starch is discarded as an unwanted byproduct of food processing. Starch is readily biodegradable and does not persist in most environments for a significant period after disposal due to microbial activity. Due to the biodegradable nature of starch, there have been many attempts to incorporate it into a variety of materials. Starch has been incorporated into multi-component compositions in various forms, including as filler and binder, and has been used as a constituent within thermoplastic polymer blends. Starch can be used as a binder or glue to adhere solid constituents together to form a heterogenous mixture of different components. At some point before or during the molding phase, the starch is typically dissolved or gelatinized in an appropriate solvent, such as water, so that the starch becomes a flowable material into which the other components can be dispersed. Since native starch has a melting point that approaches its decomposition temperature, it is necessary to add polar liquids or solvents to allow the starch to become molten, solvated or otherwise liquified into a plastic state at a temperature that is safely below its decomposition temperature. Upon re-solidification of the gelatinized starch, typically by removing enough of the water by evaporation so that the starch recrystallizes or otherwise dries out, the starch forms a solid or semi-solid binding composite that can bind the remaining components together. Many have attempted for years to perfect a starch blend that would yield an environmentally sound material while, at the same time, being economical to make, but this has proven difficult.

Alkyl ketene dimers (AKDs) are typically used for sizing in the pulp and paper industry. The term sizing as used in the present context means to reduce the tendency of the dry material to absorb water. Alkyl ketene dimers are synthesized from fatty acids. The reaction with ketene dimers effects the formation of bridges that narrow the pores of fibers so that the passage of water across the fiber is greatly delayed.

Several types of uncoated, fluorochemical-free papers are produced by Twin Rivers Paper Company LLC (Madawaska, Maine, USA). Among them are ACADIA, an uncoated, lightweight packaging paper specifically adapted for use as bags, pouches, wraps and interleavers for the food service and consumer packaging goods industries; and ACADIA ECOBARRIER, a paper food wrap for quick serve restaurants and fast food applications. Both of these products are too light to be useful in the preparation of food serving containers, and are not moisture resistant.

U.S. Pat. No. 6,168,857 relates to sheets having a starch-bound matrix reinforced with fibers, and methods for manufacturing the same. The starch-bound matrix is prepared by mixing water with unmodified and ungelatinized starch granules, an auxiliary water-dispersible organic polymer binder, fibers, and optionally an inorganic mineral filler. The dough is then squeezed/rolled into a sheet. The sheet is designed to disintegrate quickly in water.

US Patent Publication No. 2002/0123624 relates to the preparation of hydrophobically esterified starches by heating a mixture of cationic starch with a ketene dimer in the presence of an enzyme, or absence of a chemical catalyst, a base, or an organic solvent.

U.S. Pat. Nos. 6,878,199; 7,967,904; and 7,083,673 relate to biodegradable or compostable containers that can hold food products in dry, damp, or wet conditions and methods for their preparation. The containers are prepared by forming a pre-gelled potato starch suspension; adding to the pre-gelled potato starch suspension a dry or damp, homogeneous mixture comprising one or more native starches; and molding the homogenous moldable composition with heat. These methods entail dispersing fiber or wood flour in a starch matrix to form a moldable matrix. The material is then heated/baked to drive off water and form a solid material. These composites are moisture sensitive and require an external coating material.

U.S. Pat. No. 10,145,068 relates to a process for the preparation of paper or paper board product comprising adding at least one dry strength additive to mechanical and/or chemi-mechanical pulp and subjecting the mixture to heat and an overpressure of above 40 kPa. The paper or paper board may comprise less than 0.01% cationic or anionic starch.

U.S. Pat. No. 10,378,152 relates to paper for packaging that offers resistance to water, grease, and oil penetration, and that can be easily recycled and/or biologically degraded. The food packaging paper is prepared by coating the base paper on at least one side with vegetable oil encapsulated in a polymer, talc, and at least one binder. The base paper is produced with fiber pulp, titanium dioxide, and a small amount of an alkyl-ketene dimer.

U.S. Pat. No. 10,626,557 relates to fibrous sheets that disintegrate in water, and cores containing these sheets. The sheets are prepared by depositing paper pulp comprising fiber and additives on the wire of a forming table of a paper making machine, and spraying starch to the paper pulp before the sheet enters the press. A paper sheet containing 33% starch may be formed using this process.

Thus, alternatives are urgently needed of biodegradable or compostable hot water and oil resistant uncoated, fiber/starch composite sheets manufactured without the use of fluorochemicals.

SUMMARY OF THE INVENTION

Provided herein are uncoated cellulosic fiber/starch materials, where the starch is evenly distributed within a fiber matrix, and the cellulosic fiber/starch materials do not comprise fluorocarbons or auxiliary binders. Without the addition of an oil-resistant coating, the cellulosic fiber/starch materials disclosed herein offer superior oil and grease resistance. When an internal sizing agent is added in the preparation of the cellulosic fiber/starch materials, the materials also offer superior hot water resistance and cold water resistance. The cellulosic fiber/starch materials are useful for the manufacture of food service containers.

In an embodiment, the invention relates to a composition comprising a composite of starch and cellulosic fiber, and optionally an internal sizing agent. The cellulosic fiber/starch composition of the invention is oil resistant. In the composition of the invention the starch is evenly distributed within a fiber matrix, forming pores that do not allow liquids to penetrate. The composition of the invention does not comprise a fluorochemical or an auxiliary binder; and to be oil resistant, the composition does not require an oil-resistant coating. In some embodiments of the invention, the starch in the composition of the invention is at least about 20% to at least about 50% of the fiber matrix by weight. In some embodiments of the invention, the starch in the composition of the invention is at least about 30% of the fiber matrix by weight. In some embodiments, the invention relates to an oil and grease resistant sheet prepared with a composition of the invention.

In an embodiment, the invention relates to a hot water resistant, cold water resistant, and oil and grease resistant cellulosic fiber/starch material comprising fiber, starch, and an internal sizing agent integrated among the fiber and starch. In the composition of the invention the starch is evenly distributed within a fiber matrix, forming a material with small pores or no pores, so that it is not possible for the internal sizing agent, oil, or water to penetrate it. Not being bound by theory, it is believed that the added internal sizing agent coats the starch granules on the surface not allowing liquids to penetrate. In some embodiments of the invention, the internal sizing agent used to prepare the fiber and starch cellulosic fiber of the invention is an alkyl, alkenyl, aryl, alkaryl ketene dimer, alkenyl succinic anhydride (ASA), rosin, wax, stearic anhydride, or a fatty acid anhydride.

In some embodiments of the invention, the sizing agent used to prepare the fiber and starch cellulosic fiber of the invention is an alkyl ketene dimer (AKD). The starch is evenly distributed within a fiber matrix of the cellulosic material; and the cellulosic material does not comprise any of a fluorochemical, an auxiliary binder, a grease and oil resistant coating, or a moisture resistant coating. In some embodiments of the invention, the starch in the hot water resistant, cold water resistant, oil and grease resistant cellulosic material of the invention is at least about 20% to at least about 50% of the fiber matrix by weight. In some embodiments of the invention, the starch in the hot water resistant, cold water resistant, oil and grease resistant cellulosic material of the invention is at least about 30% of the fiber matrix by weight. In some embodiments, the invention relates to a hot water resistant, cold water resistant, and oil and grease resistant cellulosic fiber/starch sheet. In some embodiments of the invention, the starch in the cellulosic sheet of the invention is at least about 30% of the fiber matrix by weight.

In an embodiment, the invention relates to an article of manufacture comprising a cellulosic material of the invention. In some embodiments of the invention, the article of manufacture comprising a cellulosic material of the invention is a food container. In some embodiments of the invention, the food container comprising a cellulosic material of the invention is a box, a cup, a clamshell, a plate, a bowl, a tray, a carton, an envelope, a sack, a bag, a baggie, a liner, a partition, a wrapper, a film, or a cushioning material.

In an embodiment, the invention relates to a method for preparing an oil and grease resistant cellulosic material comprising fiber and starch. The method comprises blending fiber, water, and starch to create a slurry; compressing and heating the slurry to remove water until forming a cellulosic material. The method does not comprise adding a fluorocarbon or an auxiliary binder; or adding an oil and grease resistant coating. In some embodiments of the invention, prior to compressing and heating the slurry, most of the free water is removed by draining by gravity. In some embodiments of the invention, in the method for preparing a cellulosic material comprising fiber and starch, the starch is at least about 30% to at least about 50% of the fiber matrix by weight. In some embodiments of the invention, in the method for preparing a cellulosic material comprising fiber and starch, the starch is at least about 35% of the fiber matrix by weight. In some embodiments of the invention, in the method for preparing a cellulosic material comprising fiber and starch, an internal sizing agent is added to the fiber, native starch, and water slurry. When adding an internal sizing agent to the slurry, the resulting cellulosic material is oil and grease resistant, as well as hot water resistant and cold water resistant. In some embodiments of the invention, the internal sizing agent used in the method for preparing a cellulosic material is an alkyl, alkenyl, aryl, alkaryl ketene dimer, alkenyl succinic anhydride (ASA), rosin, wax, stearic anhydride, or a fatty acid anhydride. In some embodiments of the invention, the internal sizing agent used in the method for preparing a cellulosic material is alkene ketene dimer (AKD).

BRIEF DESCRIPTION OF THE DRAWINGS

FIG. 1 depicts the contents of an Arnold Grummer's 411236 hand papermaking kit. [1] Wood paper mold; [2] Paper-making screen; [3] Plastic support grid; [4] Fastening straps; [5] Water removal screen; [6] Couch sheets; [7] Instructions.

DETAILED DESCRIPTION

The present invention relates to cellulosic materials comprising fiber and starch that are oil and grease resistant. Addition of an internal sizing agent to the cellulosic materials comprising fiber and starch results in cellulosic materials that are also hot water resistant and/or cold water resistant. The cellulosic materials are prepared without the use of fluorochemicals or auxiliary binders, and do not require oil resistant or water resistant coatings. The cellulosic materials are useful for the manufacture of food serving containers.

Paper is made in two steps. In the first step cellulose fibers are extracted from a variety of sources and converted to pulp; and in the second step pulp is combined with water and placed on a paper making machine where it is flattened, dried, and cut into sheets and rolls. Most paper is made from forestry products, usually trees. The most common of trees used for making paper are Spruce; Pine; Fir; Larch; Hemlock; *Eucalyptus*; Aspen; and Birch. Some paper is made from cotton and other natural fibers, and some paper is made from recycled fibers such as pre-consumer waste, post-consumer waste, and saw dust. When using forestry products, the fiber is separated from the bark and lignin to prepare pulp. Pulp is prepared by using a mechanical process or a chemical process. During mechanical pulping, the logs are ground using a machine consisting of a rotating disk and a fixed steel plate. Usually heat and chemicals are used to aid in this process. During chemical pulping the logs are cut into small chunks using a wood-chipper-looking machine, where they are combined with hot water and chemicals. The mixture is transferred to a pressure cooker where the chips disintegrate due to the heat, pressure, and chemicals.

Furnish is the term used for the water-suspended mixture of paper pulp and non-fibrous additives such as fillers, dyes, or sizing from which paper or paperboard is made. At the "Wet End" of the papermaking machine the pulp is mixed with water, fillers, and additives, and poured onto a mesh belt. In the "Wet Press Section" the pulp moves off the mesh belt and onto a felt belt, and moves through a series of high pressure rollers designed to push the liquid into the felt. In the "Dryer Section" the web of paper is weaved through a series of heated rollers, and felt belts assist in moisture removal. Finally, in the "Calender Section" rollers put pressure on the paper to create a thin paper with a smooth finish.

According to the Archer-Daniels-Midland Company (ADM) website, the starch content in a typical sheet of copy paper may be as high as 8 percent (see ADM Papermaking website). Paper sheets with high starch content are known in the art.

Surprisingly, the inventors have discovered that by adding native starch to slurry pulp, a quantity of starch is entrapped within the fiber matrix, and remains entrapped during the sheet-forming, and dewatering steps. When heat and pressure were applied to facilitate drying, the entrapped starch gelatinized and filled voids in the fiber matrix. Once the paper sheet dried, the starch acted as a binder that improved the strength and stiffness of the finished cellulosic sheet. In addition, the starch, which was interspersed throughout the fiber matrix, effectively sealed the entire fiber matrix and prevented oil penetration. The inventors experimented with different concentrations of native starch added to the slurry pulp. They surprisingly found that a final concentration of about 30% (dry weight basis) starch in the fiber matrix was adequate to provide excellent oil resistance. Oil droplets applied to the surface of the dried cellulosic sheet remained on the surface, and did not penetrate the cellulosic sheet during test runs lasting more than one-hour each. In the preparation of the paper sheet of the invention, no fluorocarbon or auxiliary binder was used in the preparation of the cellulosic material, and no oil-resistant coating was used on the sheet.

To prepare the compositions of the invention it is possible to add to the fiber slurry native or modified starches, mineral particles, lignocellulose particles, a compostable biodegradable or inorganic filler, or mixtures thereof. It is preferred that any additions to the fiber slurry are non-toxic. Modified starches are prepared by physically, enzymatically, or chemically altering the inherent properties of the starches. Examples of starches are corn starch, potato starch, wheat starch, rice starch, tapioca starch, arrowroot starch, sorghum starch, sago starch, pea starch, banana starch, chayotexle starch, and coconut starch. It is possible to prepare the cellulosic fiber/starch compositions of the invention using lightly chemically modified starches, partially gelatinized starches, pre-gelatinized high amylose starches, nanoparticulate starches, or dried starch polyelectrolyte complexes, among others.

While the fiber/starch sheets prepared in Example 1 had excellent oil/grease resistance, the samples failed the hot water test. When treated with hot water, the fiber/starch matrix became soft, developed leaks, and failed. In traditional papermaking, sizing materials are added to improve the paper's resistance to water and/or other liquids. One of the critical properties of uncoated and untreated paper and board for food packaging applications is its low resistance to high moisture content, which can cause disintegration of the paper and board material in such applications. U.S. Pat. No. 5,961,708 teaches the use of alkyl ketene dimers (AKDs) together with treated degraded starch as an internal sizing agent to increase the hydrophobicity of paper.

Internal sizing agents may be AKDs, alkenyl succinic anhydride (ASA), rosin, wax, stearic anhydride, or other fatty acid anhydrides, which may provide hydrophobicity, retention, and distribution in acid, neutral, or alkaline sizing environments. Surface sizing agents may be starch or wax-based products that improve the printing characteristics, water resistance, and oil resistance of papers. Sizing agents are known to confer moisture resistance to paper products. But less is known about the interaction of the sizing agents with native starch granules during the gelatinization process.

AKDs are typically used for sizing in the pulp and paper industry. The term sizing means to reduce the tendency of the dry material to absorb water. AKDs are synthesized from fatty acids, and are commercially available, for example, from Hercules Inc. (Wilmington, Delaware, USA). Examples of commercially-available AKDs are AQUAPEL surface or internal sizing agent (Solenis International, L. P.; Wilmington, Delaware, USA); HERCON paper sizing agent (Hercules Powder Company Corporation; Wilmington, Delaware, USA); and NOVASIZE Emulsifying agent for the internal sizing of paper (Georgia-Pacific Chemicals LLC; Atlanta, Georgia, USA). The reaction with ketene dimers effects the formation of bridges that narrow the pores of fibers so that the passage of water across the fiber is greatly delayed. When including AKD in the paper, the main stages of preparation are: (a) Preparing an aqueous alkaline emulsion of alkyl ketene dimer. (b) Saturating a basic laminar cellulose material with the emulsion. (c) Drying the saturated laminar cellulose material at elevated temperature, thus accelerating the reaction between the alkyl ketene dimer and cellulose (J. K. Fink, 2019, "The Chemistry of Bio-based Polymers," pp. 256-257, John Wiley & Sons).

The inventors discovered that combining AKD and starch in pulp fiber slurries resulted in paper products that had excellent hot water and cold water resistance. Boiling water was poured into a cup formed from the cellulosic product containing fiber, starch, and AKD to determine the hot water moisture sensitivity of the newly formed cup. The inventors expected some improvement in moisture resistance due to the reaction of AKD with the fiber fraction. Surprisingly, moisture resistance dramatically improved. The cup was filled with boiling water, and over at least a twelve-hour period of observation no signs of softening or leakage were observed. In fact, the cup remained rigid even after the water eventually evaporated. Without being bound by theory, the fact that the final cellulosic starch sheet did not soften even after being exposed to water for over 12 hours may be because the AKD material was incorporated throughout the sheet rather than the AKD material being used as a coating. The instant disclosure uses native starch, pulp, and an AKD to prepare a cellulosic sheet that is hot water, cold water, and oil resistant. The cellulosic fiber/starch sheet is prepared without the addition of fluorochemicals, auxiliary binders, or coated with oil resistant or water resistant coatings.

The cellulosic materials disclosed in the instant application are a good alternative to PFAS-treated paper products. The even distribution of AKD inside the sheet surprisingly improves the moisture resistance of both, the fiber and starch components, while the starch component provides an excellent barrier to oil penetration. FDA 21CFR176.120 stipulates that AKD is not to exceed 0.4 wt % of the final product. In Example 2 AKD was added at 1 wt % relative to the weight of the fiber fraction. The final amount of AKD for the finished product was about 0.4 wt %, and complies with the FDA regulation. The fiber/starch/AKD material prepared as in the instant disclosure may be used, for example, for food packaging, paper straws that are stiff and don't soften, paper cups, etc. When these products are prepared with the cellulosic sheets of the invention, they avoid the use of PFAS altogether.

The inventors further show that when using a molded pulp-type of methodology to prepare a cellulosic fiber/starch/AKD mixture, this pulp was water and oil resistant. The inventors further show that using vacuum, as commonly used in the cast at industrial pulp molding, the vacuum removed more starch granules with the water in the cast wet mat than the soaker-pressing method or the molded pulp type method. The inventors also show that when using partially cooked pea starch, there is an increase in starch retention in the cast wet mat. But, they also show that it is necessary for the starch in the wet cast mat to be at least about 30% for the cellulosic fiber/starch material to show good oil resistance.

In Example 7 the inventors show that when using partially cooked HYLON VII high amylose starch, the starch retention was about 3.5 times that of using native starch granules. The cellulosic fiber/starch sheet prepared in this Example presented no oil resistance, even when the dry cast starch in the sheet was at least about 30%. The cellulosic fiber/starch compositions of the invention provide good water resistance when native (non-gelatinized), partially gelatinized, or a particulate form of starch is used in concert with AKD in the initial formulation. The inventors found that a composite consisting of fiber, fully gelatinized starch dispersion (in which the granules were largely disrupted) and AKD did not confer any water resistance.

The cellulosic fiber/starch compositions of the invention may comprise a filler. The filler in the cellulosic fiber/starch compositions of the invention may be a mineral, a lignocellulose particle, or any compostable material useful as a filler, either biodegradable or inorganic. It is preferred that a filler added to the cellulosic fiber/starch compositions of the invention be non-toxic. The cellulosic fiber/starch materials of the invention may be used as paper or paperboard. The cellulosic materials within the scope of the invention can have greatly varying thickness depending on the particular application for which the cellulosic material is intended. The cellulosic sheets can be as thin as about 0.001 mm and as thick as 1 cm or greater depending on the strength, durability, and/or bulk desired for the application for which the cellulosic sheet is intended. The term "sheet" is inclusive of films, which are typically very thin sheets (e.g., less than about 0.01 mm).

The cellulosic sheets of the invention can be used in a variety of products, including those having properties similar to conventional paper or paperboard. The cellulosic sheets and films of the invention can also substitute for sheets and films made from plastic, polystyrene, and even metal. The cellulosic sheets of the invention can be cut and formed (such as by bending, folding, rolling, or gluing) into a variety of containers and other articles of manufacture. The compositions and methods of the invention are particularly useful in the mass production of disposable containers and packaging, such as for the fast food industry.

Molded pulp is fiber-based material that is used for many types of shaped containers such as egg cartons, food service trays, beverage carriers, end caps, trays, plates, bowls, and clamshell containers. Molded pulp packaging is formed into shapes. It does not start as a flat sheet, instead, it is designed with round corners and complex three-dimensional shapes. To prepare molded pulp packaging, the fiber is dispersed in excess water. Molds formed of wire mesh are then lowered into the pulp mixture where vacuum draws the fiber mixture through the wire mesh. As the mixture is drawn through the mold, the fiber component is deposited on the mold surface while the water component is drawn through the mold and diverted into a holding tank. After forming, the parts are wet and need to be dried. Traditional molded pulp packaging such as egg cartons is dried on open-air drying racks. Thin-walled molded pulp packaging such as plates or bowls are dried using automatic, high temperature and high pressure drying machines. Each product is pressed onto solid metal tools to smooth the surfaces. The cellulosic material comprising fiber and starch, and optionally comprising an internal sizing agent may be used in the preparation of molded pulp packaging.

Other types of processing may be possible such as air fluffing the fiber using a hammer mill, mixing with dry starch, spraying on an AKD emulsion, and hot pressing. The potential advantages of these process may include less water usage, less energy usage, and faster processing. There might also be opportunities for processing at intermediate moisture contents (say about 50-90% water). These could include dispersing fiber, granular starch, water and AKD in a high intensity mixer followed by pressing in a heated mold, or twin-screw-extrusion of the mixture through a sheet die followed by hot pressing.

Example 3 shows the preparation of a cellulosic fiber/starch/AKD sheet using a molded pulp type of methodology instead of the soaker pressing method used in Examples 1 and 2. The resulting cellulosic fiber/starch/AKD sheet, which contained AKD at 4% of the fiber weight, was oil and water resistant. Examples 4 and 5 show the preparation of a cellulosic fiber/starch sheet using vacuum instead of the soaker pressing method used in Examples 1 and 2. This Example shows that when using vacuum, the starch granules are sucked-off with the water, causing a much lower starch retention in the cast wet mat.

Example 6 shows that when using vacuum and partially cooked starch, the starch retention increases about 6 times when compared to using native starch and vacuum. This Example also shows that it is necessary for the starch to be at least about 30% for the cellulosic fiber/starch material to show good oil resistance.

In Example 7, the native starch is replaced with HYLON VII high amylose starch in the preparation of cellulosic fiber/starch materials using vacuum. This Example shows that cellulosic fiber/starch material prepared with HYLON VII high amylose starch retains a larger amount of starch than when using native starch. This Example also shows that cellulosic fiber/starch material prepared with HYLON VII high amylose starch is not oil resistant.

The term "container" as used in this specification and the appended claims is intended to include any article, receptacle, or vessel utilized for storing, dispensing, packaging, portioning, or shipping various types of products or objects (including, but not limited to, food and beverage products). Specific examples of such containers include, boxes, cups, clamshells, jars, bottles, plates, bowls, trays, cartons, cases, crates, cereal boxes, frozen food boxes, milk cartons, carriers for beverage containers, dishes, egg cartons, lids, straws, envelopes, sacks, bags, baggies, or other types of holders. In addition to integrally formed containers, containment products used in conjunction with containers are also intended to be included within the term "container." Such articles include, for example, lids, liners, partitions, wrappers, films, cushioning materials, utensils, and any other product used in packaging, storing, shipping, portioning, serving, or dispensing an object within a container.

In addition to sheets and containers, any articles that can be formed using the cellulosic materials described herein are also within the scope of the invention. These include such disparate articles as, model airplanes, book covers, game boards, toys, venetian blinds, mailing tubes, shirt packaging forms, table place mats, and temporary car window shades.

Where a cellulosic sheet is to be used to print magazines or other reading material, it will have a thickness that is comparable to conventional paper products, which typically have a thickness of about 0.05 mm. Printable sheets requiring greater flexibility and lower stiffness (such as regular pages of a magazine or brochure) will typically have a thickness of about 0.025-0.075 mm. Those requiring greater strength, stiffness, and lower flexibility (such as magazine or brochure covers) will have a thickness of about 0.1 to 2 mm. The thickness and flexibility of any particular cellulosic sheet will depend on the desired performance criteria of the reading or other printed material in question. Films will generally have a thickness in a range from about 1 micrometer to about 0.1 mm.

Cellulosic sheets and films prepared according to the methods of the invention may be subjected to additional processing steps, depending on the properties desired for the sheets and films, which, in turn, depends on the ultimate use intended for the sheets and films. These optional processes may include corrugation, printing of indicia, scoring, perforation, creping, acid treatment, or combinations thereof.

It may be desirable to apply print or other indicia, such as trademarks, product information, container specifications, or logos, on the surface of the cellulosic sheets, or articles prepared with the starch/fiber cellulosic materials of the invention. This can be accomplished using any conventional printing means or processes known in the art of printing paper or cardboard products, including planographic, relief, intaglio, porous, or impactless printing. In addition, the cellulosic sheets or articles prepared with them may be embossed or provided with a watermark. In addition, decals, labels, or other indicia can be attached or adhered to the cellulosic sheet using methods known in the art. Printed indicia may be applied to a continuous sheet, individual sheets, blanks, or completed articles depending on the printing process involved and the shape of the article.

Cellulosic material comprising fiber and starch, and optionally comprising an internal sizing agent have diverse uses. This material may be used in the preparation of containers suitable for holding dry materials, such as dried fruit, or raw nuts (such as almonds). The cellulosic material of the invention may also be used in the preparation of containers suitable for holding damp materials, such as holding fresh mushrooms or tomatoes (for example in groups of 4 or 6), and should be able to perform this function for a period of at least about two to three weeks since normal packing to use time is about 14 days. The cellulosic material comprising fiber and starch, and optionally comprising an internal sizing agent of the invention can also be used as a container for a hot fast food item such as French fries or hamburger, in which case the container needs to last for only a short time, for example about one hour after addition of the hot fast food. The cellulosic material comprising fiber and starch, and comprising an internal sizing agent of the invention could also be used, in combination with an adsorbent pad, to package raw meat. In this case, the cellulosic material comprising fiber and starch, and comprising an internal sizing agent needs to withstand exposure to the meat for a period of seven days or longer, and desirably can stand at least one cycle of freeze and thaw. If possible, this package should be able to withstand a microwave signal. When prepared for holding wet foods, a container prepared with the cellulosic material comprising fiber, starch, and an internal sizing agent of the invention will suitably have the ability to hold a hot liquid, such as a bowl of soup, a cup of coffee, or other food item for a period of time sufficient to allow consumption before cooling, for example within one hour of purchase. Such containers can also be used to hold a dry product that will be re-hydrated with hot water such as the soup-in-a-cup products.

Articles made from the cellulosic material comprising fiber and starch, and optionally comprising an internal sizing agent present invention to can be manufactured into a wide variety of finished articles that can presently be made with plastics, paper, paperboard, polystyrene, metals, ceramics, and other materials. Merely by way of example, it is possible to manufacture the following exemplary articles: films, bags, containers, including disposable and nondisposable food or beverage containers, cereal boxes, sandwich containers, "clamshell" containers (including, but not limited to, hinged containers used with fast-food sandwiches such as hamburgers), drinking straws, baggies, golf tees, buttons, pens, pencils, rulers, business cards, toys, tools, Halloween masks, building products, frozen food boxes, milk cartons, fruit juice containers, yoghurt containers, beverage carriers (including, but not limited to, wraparound basket-style carriers, and "six pack" ring-style carriers), ice cream cartons, cups, French fry containers, fast food carryout boxes, packaging materials such as wrapping paper, spacing material, flexible packaging such as bags for snack foods, bags with an open end such as grocery bags, bags within cartons such as a dry cereal box, multiwell bags, sacks, wraparound casing, support cards for products which are displayed with a cover (particularly plastic covers disposed over food products such as lunch meats, office products, cosmetics, hardware items, and toys), computer chip boards, support trays for supporting products (such as cookies and candybars), cans, tape, and wraps (including, but not limited to, freezer wraps, tire wraps, butcher wraps, meat wraps, and sausage wraps); a variety of cartons and boxes such as corrugated boxes, cigar boxes, confectionery boxes, and boxes for cosmetics-, convoluted or spiral wound containers for various products (such as frozen juice concentrate, oatmeal, potato chips, ice cream, salt, detergent, and motor oil, mailing tubes, sheet tubes for rolling materials (such as wrapping paper, cloth materials, paper towels and toilet paper), and sleeves; printed materials and office supplies such as books, magazines, brochures, envelopes, gummed tape, postcards, three-ring binders, book covers, folders, and pencils, various eating utensils and storage containers such as dishes, lids, straws, cutlery, knives, forks, spoons, bottles, jars, cases, crates, trays, baking trays, bowls, microwaveable dinner trays, "TV" dinner trays, egg cartons, meat packaging platters, disposable plates, vending plates, pie plates, and breakfast plates, emergency emesis receptacles (i.e., "barf bags"), substantially spherical objects, toys, medicine vials, ampules, animal cages, firework shells, model rocket engine shells, model rockets, coatings, laminates, and an endless variety of other objects.

A container prepared with the cellulosic material comprising fiber and starch, and optionally comprising an internal sizing agent of the invention should be capable of holding its contents, whether stationary, in movement, or while handling, while maintaining its structural integrity and that of the materials contained therein or thereon. This does not mean that the container is required to withstand strong or even minimal external forces. In fact, it can be desirable in some cases for a particular container to be extremely fragile or perishable. The container should, however, be capable of performing the function for which it was intended. The necessary properties can always be designed into the material and structure of the container beforehand.

A container prepared with the cellulosic material comprising fiber and starch, and optionally comprising an internal sizing agent of the invention should also be capable of containing its goods and maintaining its integrity for a sufficient period of time to satisfy its intended use. It will be appreciated that, under certain circumstances, the container can seal the contents from the external environments, and in other circumstances can merely hold or retain the contents.

The containers within the purview of the present invention can or cannot be classified as being disposable. In some cases, where a stronger, more durable construction is required, the container might be capable of repeated use. On the other hand, the container might be manufactured in such a way so as to be economical for it to be used only once and then discarded. The present containers have a composition such that they can be readily discarded or thrown away in conventional waste landfill areas as an environmentally neutral material. The containers may be allowed to biodegrade.

The articles within the scope of the present invention can have greatly varying thicknesses depending on the particular application for which the article is intended. They can be as thin as about 1 mm for uses such as in a cup. In contrast, they can be as thick as needed where strength, durability, and or bulk are important considerations. For example, the article can be up to about 10 cm thick or more to act as a specialized packing container or cooler. Thus, the thickness of an article may be any thickness between about 0.1 mm and 10 cm, or a portion thereof. The thickness of most other articles ranges from about 0.1 mm to about 1 cm, with about 0.5 mm to about 6 mm being the most common.

The cellulosic sheets of the invention may be as thin as about 0.1 mm or less where very thin, flexible, and lightweight sheets are required. The cellulosic sheets may also be as thick as about 1 cm where relatively thick, strong, and stiff sheets are required. In addition, sheets may range in density from as low as about 0.6 g/cm$^3$ to as high as about 2 g/cm$^3$. Generally, higher density sheets are stronger while lower density sheets are more insulating. The exact thickness or density of a particular sheet can be designed beforehand in order to yield a sheet having the desired properties at a cost which allows the sheets to be produced in an economically feasible manner.

The cutting mechanisms utilized with paper and paperboard can also be utilized to cut a continuous cellulosic sheet of the invention into individual sheets. Cutting can also be accomplished by using continuous die cut rollers, by pressing a cutting die into the sheet, or by other means known in the art.

As used herein, the term "about" is defined as plus or minus ten percent of a recited value. For example, about 1.0 g means 0.9 g to 1.1 g.

Unless otherwise explained, all technical and scientific terms used herein have the same meaning as commonly understood by one of ordinary skill in the art to which this disclosure belongs. The singular terms "a", "an", and "the" include plural referents unless context clearly indicates otherwise. Similarly, the word "or" is intended to include "and" unless the context clearly indicate otherwise.

As used herein, the term "cellulosic fiber" is meant to include any fiber incorporating cellulose as a major constituent.

As used herein, the term "Papermaking fibers" means cellulosic fibers and includes virgin pulps, recycled (secondary) cellulosic fibers, or fiber mixtures comprising reconstituted cellulosic fibers. Cellulosic fibers suitable for making the fibrous sheet of this invention include non-wood fibers, and wood fibers. Non-wood fibers may be cotton fibers or cotton derivatives, abaca, kenaf, sabai grass, flax, esparto grass, straw, jute, hemp, bagasse, milkweed floss fibers, and pineapple leaf fibers. Wood fibers may be those obtained from deciduous and coniferous trees, and may be softwood fibers or hardwood fibers. Softwood fibers include Northern and Southern softwood Kraft fibers; and hardwood fibers include *Eucalyptus*, maple, birch, aspen, or the like. Papermaking fibers used in connection with the invention include naturally occurring pulp-derived fibers as well as reconstituted cellulosic fibers such as lyocell or rayon. Pulp-derived fibers are liberated from their source material by any one of a number of pulping processes familiar to one experienced in the art. The pulping process may include sulfate, sulfite, polysulfide, soda pulping, etc. If desired, the pulp can be bleached by chemical means including the use of chlorine, chlorine dioxide, oxygen, alkaline peroxide, and so forth. Naturally occurring pulp-derived fibers are referred to herein simply as "pulp-derived" papermaking fibers. The products of the present invention may comprise a blend of conventional fibers (whether derived from virgin pulp or recycle sources) and high coarseness lignin-rich tubular fibers, such as bleached chemical thermomechanical pulp (BCTMP). Pulp-derived fibers may also include high yield fibers such as BCTMP as well as thermomechanical pulp (TMP), chemi-thermomechanical pulp (CTMP) and alkaline peroxide mechanical pulp (APMP).

As used herein, the term "Furnishes" and like terminology refer to aqueous compositions including papermaking fibers and native starch, and optionally comprising wet strength resins, de-bonders and the like for making paper products In addition, the cellulosic sheet according to the invention does not contain non-cellulosic fibers such as synthetic polymer fibers and the like. This terminology refers to fiber made from synthetic polymers such as polyesters, nylons, and polyolefins and so forth.

As used herein, the term "starch" refers to any natural or modified starch, and mixtures thereof. Modified starches are prepared by physically, enzymatically, or chemically altering the inherent properties of the starches. Examples of starches are corn starch, potato starch, wheat starch, rice starch, tapioca starch, arrowroot starch, sorghum starch, sago starch, pea starch, banana starch, chayotexle starch, and coconut starch.

Embodiments of the present invention are shown and described herein. It will be obvious to those skilled in the art that such embodiments are provided by way of example only. Numerous variations, changes, and substitutions will occur to those skilled in the art without departing from the invention. Various alternatives to the embodiments of the invention described herein may be employed in practicing the invention. It is intended that the included claims define the scope of the invention and that methods and structures within the scope of these claims and their equivalents are covered thereby. All publications, patents, and patent applications mentioned in this specification are herein incorporated by reference to the same extent as if each individual publication, patent, or patent application was specifically and individually indicated to be incorporated by reference.

EXAMPLES

Having now generally described this invention, the same will be better understood by reference to certain specific examples, which are included herein only to further illustrate the invention and are not intended to limit the scope of the invention as defined by the claims.

Example 1

Preparation of Oil-Resistant Paper

Granular starch added to pulp slurry improved oil resistance of the molded product. This process removes the need for spraying a barrier as a post-processing step in the preparation of oil-resistant papers.

MELOJEL Native corn starch (Corn Products Development Corporation; Westchester, Illinois, USA) was acquired from Ingredion (Westchester, Illinois, USA). Fiber was acquired from Domtar (Fort Mills, South Carolina, USA). The fiber was a Northern bleached Aspen hardwood (EP Aspen). According to the manufacturer, this grade of fiber exhibits exceptional cleanliness, good strength, and high porosity. The fibers have good collapsibility to form dense, smooth sheets with excellent coating holdout. It is a preferred pulp for papers requiring a closed surface for coating holdout. An Arnold Grummer's 411236 hand papermaking kit was purchased from Amazon (Seattle, Washington, USA).

Fiber (25 g) was carefully weighed and placed in a 4 L WARING blender. Two liters of cold tap water were added to the blender. The fiber/water mixture was blended for 30 seconds to disperse the fiber. An additional liter of water was added bringing the total water to 3 L (3,000 g). Different amounts of starch powder (as indicated in Table 1, below) were carefully weighed and added to the fiber/water mixture. The contents were blended for an additional 30 seconds. The papermaking screen of the hand papermaking kit was placed on the plastic support grid, and then strapped together at the bottom of the wooden hand mold. The assembly was placed in a plastic tub containing water. Once the wooden hand mold assembly was placed into the tub, the water level was adjusted until approximately 1 inch of water filled the bottom of the mold assembly. The fiber/starch/water mixture was blended again for 30 seconds, and immediately followed by pouring into the wooden hand mold assembly. The entire contents were stirred inside the mold assembly for about 10 seconds, and the assembly was carefully lifted evenly out of the tub. This allowed the excess water and starch to drain into the tub while the fiber and a certain quantity of entrapped starch granules remained on the papermaking screen. For the fiber/starch deposition to be evenly distributed on the papermaking screen, it was important to lift the mold evenly.

The wooden hand mold was allowed to drain for approximately 1 minute. Subsequently, the straps on the wooden hand mold were released, and the wooden hand mold was lifted from the bottom assembly. This action left a uniform deposit of fibers on the papermaking screen. Next, a cover screen was placed on top of the deposited fiber sheet. A sponge was used to compress the fiber sheet and absorb excess water. This process was repeated twice to remove excess water. The fiber sheet was then transferred onto an absorbent couch sheet, and a second absorbent couch sheet was placed on top of the fiber sheet. A rolling weight was used to squeeze additional water out of the fiber sheet. Finally, the fiber sheet was placed in a hydraulic press with heated platens. The fiber sheet rested upon a wire mess screen and a sheet of MYLAR polyester film was placed on top of the wet fiber sheet. The press was heated to 110° C., and closed with approximately 1,200 pounds force. The press was immediately opened, and the hot fiber sheet was removed from the metal screen. It was apparent that the starch within the sheet had gelatinized, making the sheet sticky. As a result, the subsequent heating/drying cycles were performed only using MYLAR polyester film sheets. The fiber sheet was sandwiched between sheets of MYLAR polyester film, and compressed again for approximately 10 seconds. The MYLAR polyester film sheets were removed to allow steam to escape. This process was repeated until the sheets were dried. Approximately 4-inch square samples were cut from the dried sample sheets from each treatment shown in table 1. The samples were treated with several separate drops of oil.

TABLE 1

Formulations used for making paper, and oil test results

| Sample | Control | S-25 | S-50 | S-100 |
|---|---|---|---|---|
| Hardwood Fiber (g) | 25 | 25 | 25 | 25 |
| Water (g) | 3,000 | 3,000 | 3,000 | 3,000 |
| Starch (g) | 0 | 25 | 50 | 100 |
| Final Wt (g) | 21.3 | 31.25 | 33.5 | 42.5 |
| Starch Wt (g) | 0 | 9.95 | 12.2 | 21.2 |
| Starch (%) | 0 | 31.8 | 36.4 | 49.9 |
| Oil Resistance | Poor | Good | Excellent | Excellent |

The control sample with no starch showed almost immediate absorption of the refined soybean oil drops. The oil penetration was readily visible from the bottom of the sample. The S-25 sample showed improved oil resistance, but not at an acceptable level. The S-50 and S-100 samples had excellent oil resistance. Both samples would be acceptable for functional purposes. To get a rough estimate of the amount of granular starch entrapped in the fiber sheet, assumptions were made about the weight of the fiber. As seen in Table 1, above, although 25 g of fiber were used for each sample, the control only weighed 21.3 g. This was expected since some fraction of the fiber remained in the WARING blender. Assuming a similar amount of fiber was lost from each sample, including samples containing starch, the approximate amount of starch could be calculated by subtracting the weight of the control sample from the total weight. Using this assumption, the amount of starch entrapped in the fiber matrix was 9.95 g; 12.2 g; and 21.2 g for samples S-25; S-50; and S-100, respectively.

This Example shows that adding starch to a fiber slurry effectively entrapped starch granules in the fiber matrix. The amount of starch in the final product can be controlled by varying the concentration of starch added to the fiber slurry. Applying heat during the final molding/drying step gelatinized the starch helping it to effectively coat the fibers, and remove any interstitial voids that could allow oil penetration.

Example 2

Preparation of Hot Water-Resistant Paper

The results of Example 1 showed that oil resistance could be obtained by adding starch into the fiber slurry. This avoids spraying with sizing agents to confer oil resistance. However, starch is hydrophilic and considered a poor barrier to water. This experiment was performed to test the effect of HERCON paper sizing agent (AKD) on the moisture resistance of fiber/starch composites reported in Example 1.

Native pea starch was obtained from PURIS, producer of plant-based, non-GMO ingredients (Minneapolis, Minnesota, USA). Fiber was acquired from Domtar (Fort Mills, South Carolina, USA). The fiber was a Northern bleached Aspen hardwood (EP Aspen). An Arnold Grummer's papermaking kit was used as in Example 1. HERCON 295 paper sizing agent (AKD) was acquired from Brenntag Specialties, Inc., South Plainfield, New Jersey. The AKD solution contained 22 to 24% AKD, at a pH of 2.1 to 3.5.

Figure 1:
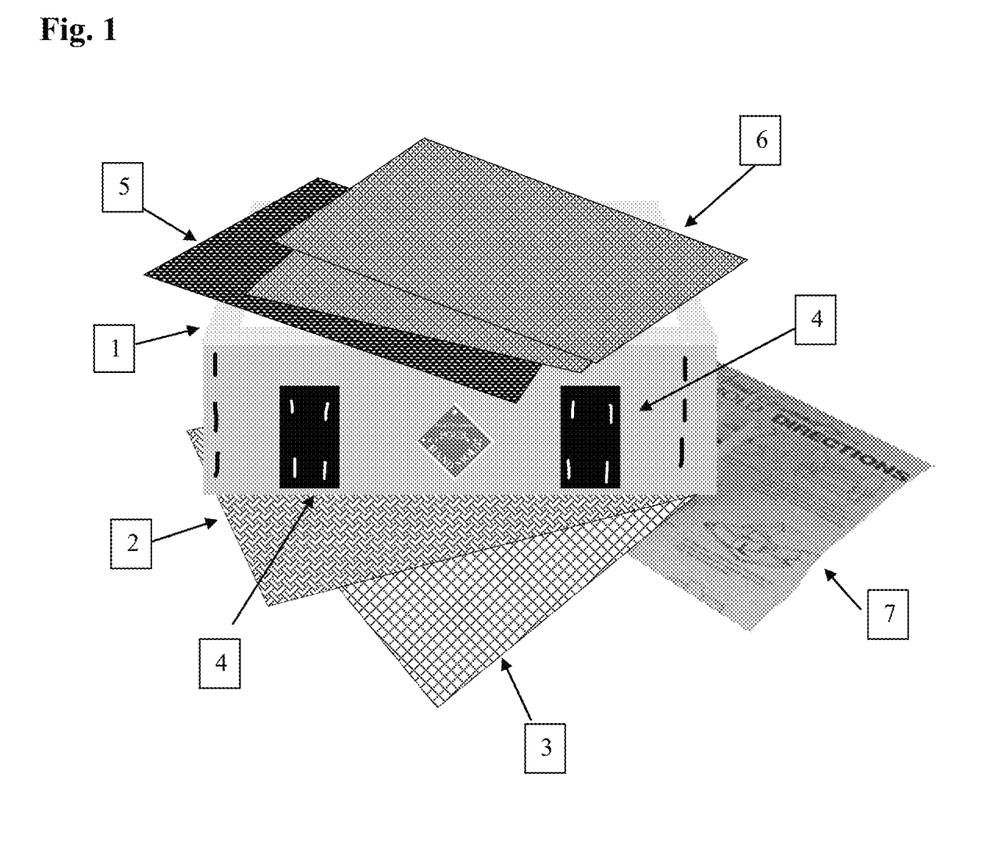
Figure 2:
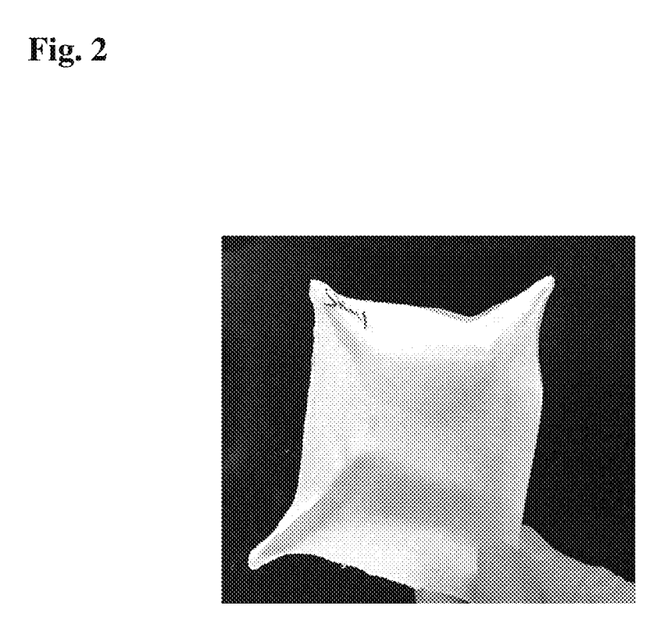
FIG. 2 depicts a picture of a cup formed with a composition of the invention, and tested for its water resistance.

Fiber (25 g) was carefully weighed and placed in a 4 L WARING blender. Two liters of cold tap water were added to the blender. The fiber/water mixture was blended for 30 seconds to disperse the fiber. An additional liter of water was added, bringing the total water to 3 L (3,000 g). Pea starch powder (50 g) was carefully weighed and added to the fiber/water mixture. The contents were blended for an additional 30 seconds. HERCON paper sizing agent (AKD) (1.0 g) was added to the blender. The materials were blended again for 15 seconds. The pH of the blender contents was measured by extending a pH probe into the solution. The pH was adjusted to between pH 9.0 to 9.5. The materials were blended again and poured into the hand papermaking mold as described in Example 1. The fiber/starch/AKD mixture was formed into a sheet as described in Example 1. The sheet was compressed and heated in a Carver Press at 110° C. and 1,200 pounds force, and placed between sheets of MYLAR polyester film until the sheets were nearly dry, but still pliable. A 4-inch square was cut from the sheet and formed into a cup (see FIG. 2). The cup was placed into an oven at 110° C. to complete the drying step. The finished cup was stiff and held water. Approximately 40 g of hot water was added to the cup. The material was inspected at various intervals to determine moisture resistance and softening of the fiber cup. The material-maintained stiffness and did not leak within 60 minutes. Even after 13 hours, the cup was still rigid and contained water. The cup was monitored until all the moisture had evaporated.

The results obtained in this Example were very surprising and unexpected. The combination of cellulosic fiber/starch/AKD resulted in a stiff paper that could be shaped and also had hot water and cold water resistance. This Example showed that pulp slurry treatments can be used to form fiber-based materials with oil, hot water, and cold water resistance, without the need of oil resistant, hot water resistant, or cold water resistant coatings.

Example 3

Preparation of Molded Pulp

A molded pulp-type of methodology was used to prepare a cellulosic fiber/starch/AKD mixture, with AKD present at 4% of fiber weight. This pulp was tested for its ability to resist water and oil.

Briefly, a wet sample sheet prepared as in Example 2, but with AKD present at 4% of fiber weight, was placed on a steel screen (with holes of about 0.5 mm), sandwiched between preheated aluminum discs. One of the aluminum disks contained channels to facilitate release of steam, and allow drying of the hot pressed disc more quickly, while the other aluminum disk was flat. After pressing for 5 minutes at 150° C., the sample was squeezed through the screen, and stuck to the screen and the channels of the lower half of the mold. To solve this sticky problem, a fiberglass porous fabric coated with TEFLON (polytetrafluoroethylene), and with much smaller holes was placed between the steel screen and the wet fiber/starch/AKD sample sheet. After pressing for 5 minutes at 150° C., the sample stayed on the screen, and the fiber/starch/AKD sample did not stick to the mold, and instead the dried disc fell out of the mold upon opening.

After putting a drop of oil and a drop of room temperature water on the pressed disc, the pressed disc was allowed to set for about an hour. There did not appear to be penetration of either drop into the disc.

On a different occasion, drops of microwave-boiling water were sprinkled all over a fiber/starch/AKD sample sheet prepared as above. The water formed beads of about 0.2 to 2 cm$^2$ which remained as beads. There was no evidence of water stains, and no water appeared to have been absorbed until the water was fully evaporated.

The results obtained in this Example show that using an appropriate screen, it is possible to prepare molded pulp using the cellulosic fiber/starch/AKD mixture of the invention. Same as in the Examples above, the cellulosic fiber/starch/AKD sheet was oil and water resistant.

Example 4

Effect of Using Vacuum

The effect of using vacuum, as commonly used in the cast at industrial pulp molding, was compared to the soaker-pressing method used in Examples 1 and 2.

A fiber blend was prepared without the addition of starch. Briefly, 2.50 g DOMTAR EP Aspen hardwood fiber (Domtar; Fort Mills, South Carolina, USA) and 200 g water were put in a 1.4 L juice blender (Hamilton Beach; Glen Allen, Virginia, USA) and blended for 30 seconds at milkshake blend speed. Following the addition of 100 g of water, the mixture was blended for another 60 seconds. The mixture was then cast into a 7.5 inch diameter (inner bottom) 120-mesh stainless sieve immersed in water. Water was added to wash out material remaining in the blender, and added to the cast.

For the vacuum test, the bottom of the sieve was touched with a VACMASTER 2.5 gallon 2 Peak HP shop vac, with each position being passed about 6 times for about 1 second each (default). The sieve containing the fiber/starch sample was dried in an oven at 150° C. for 6 minutes. Once removed from the oven, the sieve was bumped upside-down against the counter to allow the cast to fall out on to a TEFLON (polytetrafluoroethylene) mesh. The material was left in the oven until the weight was stable for at least 20 minutes. The weight of the hardwood fiber blend was 2.26 g.

Thus, in the absence of starch, pulp fiber retention was nearly 100% considering that normally about 10% of the moisture in the pulp sticks to the sheet. While the loss of pulp fiber when using the soaker-pressing method as in Examples 1 and 2, may be due to absorption into the soakers.

A fiber blend was prepared by adding 2.50 g DOMTAR EP Aspen hardwood fiber (Domtar; Fort Mills, South Carolina, USA) and 200 g water to a HAMILTON BEACH 1.4 L juice blender and blended for 30 seconds at milkshake blend speed. Following the addition of 100 g of water, the dispersion was blended for another 60 seconds. To the dispersed and blended fiber 5.0 g of MELOJEL starch were added, and the mixture was blended for an additional 30 seconds. The mixture was then cast into a 7.5 inch diameter (inner bottom) 120-mesh stainless sieve immersed in water.

The hardwood fiber/starch blend was cast and dried as above. The freshly dried sample weighted 2.46 g. Assuming that the fiber weight of the freshly dried sample is 90% of the original 2.5 g fiber weight, then the solid vacuum cast contained 0.21 g, or 8.5% of the added starch.

This Example shows that when using vacuum, the starch granules are sucked-off with the water, causing a much lower starch retention in the cast wet mat when compared to the results for sample S50 shown in Table 1.

Example 5

Effect of Using Vacuum

Another experiment was run to determine the amount of starch granules left in the hardwood fiber/starch mixture.

In this Example, 10.0 g of EP Aspen hardwood fiber (Domtar) were mixed with 800 g water in a 1.4 L WARING blender, and blended for 30 seconds, followed by the addition of 400 g water, and blending for additional 60 seconds. Twenty g MELOJEL corn starch was added, and the mixture blended for 30 seconds.

The mixture was cast into an eight inch diameter, 80 mesh stainless mesh in a 6-mesh sieve immersed in tap water. Material remaining in the blender was washed out, and added to the cast. The cast sieve was then put onto another sieve having a receiving pan. The middle sieve of the stack was connected to vacuum through a drilled hole. The connection gaps of the stack were wrapped, and vacuum was applied for about 1 minute using a 6 gallon 3 peak HP SHOPVAC.

The eighty-mesh mesh with cast was patted out. The cast was then transferred onto a polytetrafluoroethylene (PTFE) sheet. The cast was dried in a Convection oven at 160° C., until the weight was stable for 20 minutes. The fiber/starch material weighed 10.68 g. If it is assumed that the fiber weight in the freshly dried sample is 90% of the original 10 g of fiber, then the solid vacuum cast contained 15.7%, or 1.68 g of the starch.

This Example shows that vacuum sucks out much of the starch granules with the water causing much lower starch retention in the cast wet mat.

Example 6

Fiber/Partially Cooked Starch Mixture

The effect of using partially-cooked pea starch instead of native uncooked starch granules was tested.

Briefly, 75 g of 5% pea starch in water were added to a 250 ml conical flask. The mixture was heated in a microwave oven with intermittent shaking until it reached a temperature of about 75° C. The mixture appeared uniformly dispersed, and settling started at about 3 minutes.

A fiber blend was prepared by adding to a HAMILTON BEACH 1.4 L juice blender 7.50 g DOMTAR EP Aspen hardwood fiber and 600 g water, blending for 30 seconds at milkshake setting, followed by adding to this fiber dispersion 225 g of water and the partially cooked pea starch prepared above, followed by blending for a further 60 seconds.

Following the procedure disclosed in Example 4, the mixture pulp was cast in a sieve, and vacuum was applied by passing each position approximately 12 times for 1 second each. Same as in the examples above, the material was transferred to an oven until the weight was stable. The material weighted 8.45 g. Assuming that the fiber weight in the freshly dried sample was 90% of the original 7.5 g fiber weight, then the solid vacuum cast contained, 1.70 g, or 20.1% of starch. To determine the oil/grease resistance of this To test the oil/grease resistance of a cellulosic fiber/starch sheet prepared following the procedures in this Example, a sheet was prepared and maintained in an oven until the cast retained approximately 40% moisture, instead of being fully dried. A 25 cm$^2$ piece was cut with scissors from the cast, and put between upper/lower PTFE sheets, and 2× Al screens with D~1.3 mm openings, heated in an oven at 150° C., applied approximately 6000 pounds of pressure for 60 seconds. The resulting sheet was approximately 0.7 mm thick and about 0.8 g/cm$^3$.

Cooking oil at room temperature was dropped all over the sheet. For the first 5 minutes, there was no evident stain or absorption. At about 15 minutes, much of the oil had been absorbed to the upper surface, but there were no evident oil seeps through sample thickness.

A fiber/starch mixture was prepared using a larger amount of starch. Briefly, 300 g 5% pea starch in water were added to a 500 ml conical flask. The mixture was heated in a microwave oven with intermittent shaking until it reached a temperature of about 75° C. The mixture appeared uniformly dispersed, and settling started at about 3 minutes.

A fiber blend was prepared by adding to a HAMILTON BEACH 1.4 L juice blender 7.50 g DOMTAR EP Aspen hardwood fiber and 600 g water, followed by blending for 30 seconds at milkshake setting, followed by adding the partially cooked pea starch dispersion prepared above, and blending for a further 60 seconds.

The mixture pulp was cast in a sieve as in Example 4, but vacuum was applied by passing each position approximately 12 times for 1 second each. Same as in the examples above, the material was transferred to an oven until the weight was stable. Assuming that the fiber weight in the freshly dried sample is 90% of the original 7.5 g, then the solid vacuum cast contained 51.1%, or 7.05 g of starch.

This Example shows that when using partially cooked starch, the starch retention increases about 6 times when compared to the starch retention shown in Example 4. This Example also shows that it is necessary for the starch in the cast to be at least about 30% for the fiber/starch material to show good oil resistance. This Example further shows that starch may be partially cooked at an optimal temperature (for example, a temperature lower than the 75° C. used here) considering factors of processing convenience, starch retention, as well as oil and water resistances of final products.

Example 7

Use of Cooked High Amylose Starch

The effect of using partially-cooked high amylose starch instead of native was tested.

Briefly, a 100 g 5% HYLON-VII high amylose starch suspension in water were added to a 150 ml conical flask. The mixture was heated in a microwave oven with intermittent shaking until boiling. The mixture appeared uniformly dispersed, and settling started at about 3 minutes.

A fiber blend was prepared by adding to a HAMILTON BEACH 1.4 L juice blender 2.50 g DOMTAR EP aspen hardwood fiber and 200 g water, blending for 30 seconds at milkshake setting, followed by adding partially cooked HYLON VII starch as prepared above, and blending for a further 60 seconds.

The pulp mixture was cast in a sieve as in Example 4. Same as in the examples above, the material was transferred to an oven until the weight was stable. The material weighted 3.20 g. Assuming that the fiber weight in the freshly dried sample was 90% of the original 2.5 g fiber, the solid of the vacuum cast contained 29.7%, or 0.95 g starch.

A larger sample was prepared, by heating 300 g HYLON VII high amylose starch in a 500 ml conical flask, followed by shaking and microwaving as above. Again, the mixture appeared uniformly dispersed, and settling started at about 3 minutes.

A fiber blend was prepared by adding to a HAMILTON BEACH 1.4 L juice blender 7.50 g DOMTAR EP aspen hardwood fiber and 600 g water, blending for 30 seconds at milkshake setting, followed by adding the above dispersion of partially cooked HYLON VII starch and blending for a further 60 seconds.

The mixture pulp was cast in a sieve following the procedure of Example 4. Same as in the examples above, the material was transferred to an oven until the weight was stable. The material weighted 9.98 g. Assuming that the fiber weight in the freshly dried sample is 90% of the original 7.5 g, then the solid cast contained 32.4%, or 3.23 g starch.

To determine the oil/grease resistance of this mixture, a sheet was maintained in the oven until the cast had approximately 40% moisture remaining. A 25 cm$^2$ piece was cut with scissors from the cast, and put between upper/lower PTFE sheets, and 2× Al screens with D~1.3 mm openings, heated in an oven at 150° C., applied approximately 6000 pounds of pressure for 60 seconds. The resulting sheet was approximately 0.7 mm thick and about 0.8 g/cm$^3$.

Cooking oil at room temperature was dropped all over the cut sheet. A full light stain was visible almost immediately, and at 90 seconds most of the oil appeared absorbed.

In this Example starch retention was about 3.5 times that of using native starch granules. This Example also shows that the resulting fiber/starch sheet presented no oil resistance when using HYLON VII high amylose starch even when the dry cast starch in the sheet was at least about 30%. The lack of oil resistance of the sheets prepared in this Example may be due to the fact that the HYLON VII high amylose starch did not gelatinize enough because its gelatinization temperature is 140° C. due to its high amylose content.

Example 8

Composition Prepared with Fully Gelatinized Corn Starch

This Example was undertaken to determine the water resistance of a composition prepared adding AKD to fully gelatinized starch.

Briefly, AKD was added to fully gelatinized starch and used to impregnate filter paper, followed by drying in an oven. The gelatinized starch/AKD/paper became soft and sticky within a minute of exposure to water. This result is similar to that obtained when exposing paper (with no AKD) to water.

The results in this Example suggest that the addition of starch in a granular or particulate form is necessary to confer water resistance to the cellulosic fiber/starch compositions of the invention.

Example 9

Starch Retention in Screens with Different Opening Sizes

The effect of different screen opening sizes on the starch retention of a fiber/starch sheet produced as in Example 1 was tested.

Briefly, a sample containing the ingredients listed in Table 1 for S-50 was prepared following Example 1. When using a 58 mesh nylon screen with 250 micrometer holes the resulting cellulosic fiber/starch sheet contained 33% starch. When using a 325 mesh 316 stainless steel screen with 43 micrometer holes the resulting cellulosic fiber/starch sheet contained 42% starch.

This Example shows that, as might be expected, a screen with holes of smaller size gave better retention of the corn starch granules in the fiber matrix. This suggests that controlling the screen pore size may be another way of boosting starch retention.

We claim:

1. An oil, grease, and water-resistant composition comprising a matrix of starch, cellulosic fiber, and an internal sizing agent; wherein the composition is prepared by:
   blending cellulosic fiber in water to create a fiber/water mixture;
   blending the fiber/water mixture with starch granules and a sizing agent;
   forming the fiber/starch/sizing agent blend into a sheet;
   compressing and heating the sheet until nearly dry but still pliable;
   forming the nearly dry sheet into an article; and
   drying the article;
   wherein the starch is about 30 to about 50 wt % of the composition;
   wherein no fluorocarbons or auxiliary binders are in the composition;
   wherein the composition is not covered by oil resistant, hot-water resistant, or cold-water resistant coatings;

wherein the composition optionally comprises a filler material; and wherein the composition is oil, grease, and water-resistant.

2. An article of manufacture comprising the composition of claim 1.

3. The article of manufacture of claim 2, wherein the article of manufacture is a food container.

4. The article of manufacture of claim 3, wherein the food container is a box, a cup, a clamshell, a plate, a bowl, a tray, a carton, an envelope, a sack, a bag, a baggie, a liner, a partition, a wrapper, a film, or a cushioning material.

5. The composition of claim 1, wherein the internal sizing agent is an alkyl, alkenyl, aryl, alkaryl ketene dimer, alkenyl succinic anhydride, rosin, wax, stearic anhydride, or other fatty acid anhydride.

6. The composition of claim 5, wherein the internal sizing agent is an alkene ketene dimer.

7. The composition of claim 1, wherein the internal sizing agent is present from at least about 0.03% to less than about 90% by weight of the composition.

\* \* \* \* \*